July 14, 1936.   R. T. HOWES   2,047,475
PROCESS OF NEUTRALIZATION
Original Filed Nov. 18, 1930
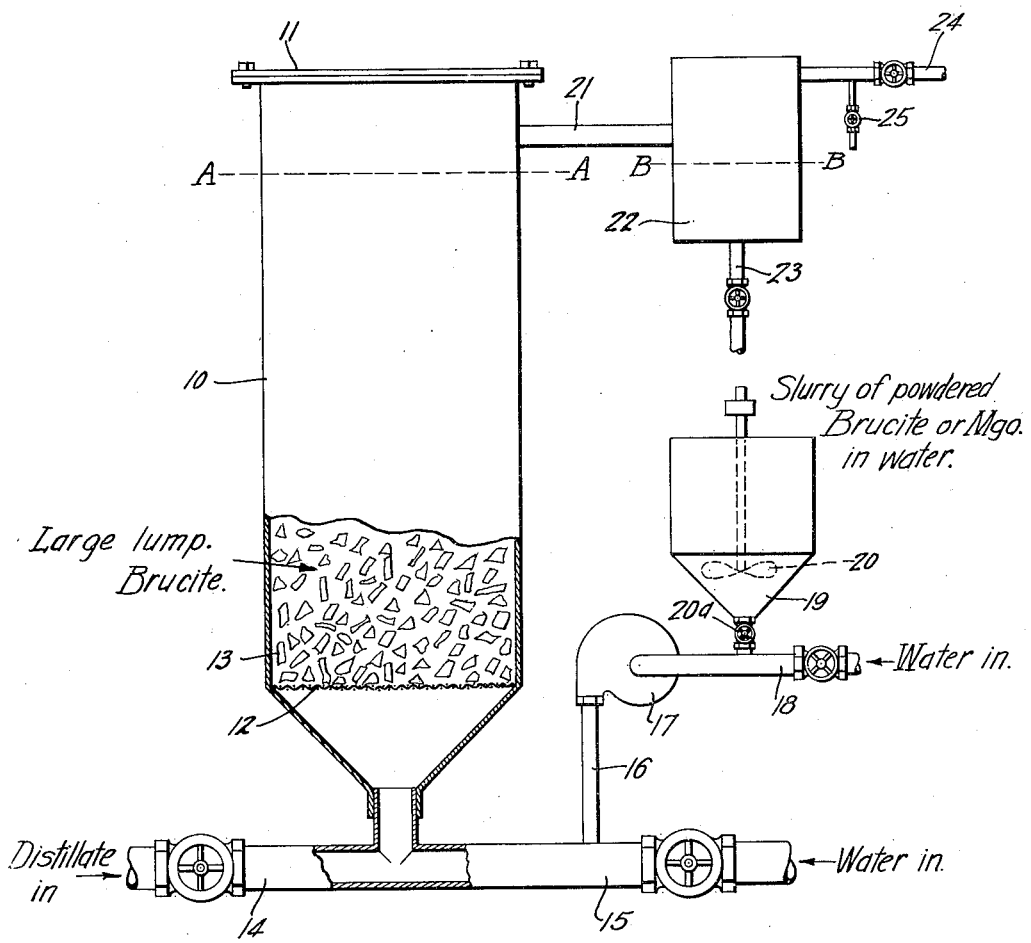
INVENTOR
Raymond T. Howes.
BY
Charles L. Stokes
ATTORNEY Patented July 14, 1936

2,047,475

UNITED STATES PATENT OFFICE 2,047,475

PROCESS OF NEUTRALIZATION

Raymond Thayer Howes, Long Beach, Calif., assignor, by mesne assignments, to Brucite Processes, Inc., Los Angeles, Calif., a corporation of California Application November 18, 1930, Serial No. 496,417
Renewed April 28, 1934

10 Claims. (Cl. 196—41)

This invention is directed to a process of neutralizing acid oils and has for its principal object the provision of continuous operation combined with simplified and accurate control in such neutralization. In general the invention is an improvement over the processes disclosed in the co-pending applications of Lyle Caldwell, which have matured into Patents 1,921,116, 1,952,622 and 1,954,116.

Referring to the single sheet of drawing, a container, or column 10 has a cover 11 and an interior screen 12 adapted to support a charge of a neutralizing material in lump form, such as is shown at 13, said charge filling the column 10 up to a predetermined level A—A.

The neutralizing material may be any one of a number of alkaline materials, but is preferably a crystallized magnesium hydroxide ($Mg(OH)_2$) mineralogically known as brucite, which is substantially insoluble in water, having a solubility therein of less than 1%, and which reacts with the acid constituents of an acid treated oil and in the presence of water to form water soluble salts of the acid, such salts having a solubility in water greater than 1%.

Equivalent material includes calcined magnesite, or MgO, and other suitable material, as fully described in said copending applications, which material is preferentially wet by water rather than by oil, the MgO, as is well known, forming a substantially water insoluble magnesium hydroxide when slurried with water, which in the present invention is always an excess to dissolve the water soluble salts formed.

Referring to the drawing:

An oil, or an oil distillate, and especially the distillates derived from the cracking of an oil under pressure (which have been treated with an acid, especially sulphuric acid) is fed under a desired pressure to the base of column 10 through a pipe 14 to pass upwardly through the neutralizing material 13 and concurrently there is likewise passed a stream of water of predetermined volume through pipe 15.

A smaller stream of water is forced into pipe 15 through a pipe 16 by pump 17 which derives its supply on the suction side through a pipe 18 which is connected with a tank 19 provided with agitating means 20 and adapted to supply a graduated quantity of slurried neutralizing material through a valve 20a. The upper end of column 10 is connected by pipe 21 to a trap 22 having a water draw-off 23 and a discharge pipe 24 provided with a try cock 25.

In operation and providing for a continuous on-stream flow of distillate, a stream of distillate, for instance pressure distillate, containing a known number of grams of acid per liter is passed upwardly into column 10 through pipe 14 and through the lump brucite, or other material, which has previously been moistened with a stream of water from pipe 15. The stream of water from pipe 16 is then started to join with the stream in pipe 15 and the first mentioned stream carries therewith a continuously supplied amount of slurried neutralizing material supplied from container 19 and fed in through valve 20a in the required volume.

The total stream of water from pipe 15 continuously passing with the oil distillate through column 10 contains sufficient slurried neutralizing material to completely neutralize the acid constituents of the distillate and the volume of the water so passed is sufficient to carry off all the water soluble salts formed by the reaction of such acid constituents with the brucite. Such neutralization by titration makes a very simple neutralization process because, knowing the acidity of the distillate, sufficient slurried neutralizing material and water may be provided.

The use of a fluid magnesium hydroxide is such as to give a means of continuous operation and, provided the neutralizing agent is in finely divided form, preferably a suspended form approaching the physical properties of a solution, extended surface contacts are a guarantee of efficient neutralization.

The material in column 10 is in large lump form, preferably one to two inches in diameter, and serves as a neutralizing reservoir to the end that any deficiency in neutralizing material from pipe 16 will be compensated for by such material in the column so that slight errors in titration are somewhat immaterial. At the same time, any water soluble salts formed on the material in column 10 (as well as the salts formed by the reaction of the suspended magnesium hydroxide) are immediately taken into solution by the stream of water passing therethrough whereby a fresh reactive surface on the material in column 10 is always available for an emergency.

The stream of oil and water containing the soluble reaction products passes into trap 22 wherein the rate of flow is reduced to permit the formation of an upper layer of oil and a lower layer of water, which layers may be withdrawn continuously at a proper rate through the pipes 26 and 25 respectively.

When the function of neutralization has been completely exercised, a sample of the oil withdrawn from the try cock 25 will be neutral in reaction, while the water from pipe 23 will be neutral or slightly alkaline.

The agitating means 20 are merely illustrative of one manner of maintaining the slurry, comprising magnesium hydroxide and water, in proper form and many other methods are available to perform the same function.

The ratio of water by volume from pipe 15 to the distillate from pipe 14 may vary from 1:8 to 1:2, but is preferably about 1:4, the column 10 serving as a mixing chamber for the same in which the lump material 13 baffles the flow for efficient mixing of the streams while having the additional function of a neutralizing reservoir, as described.

It is, of course, apparent that the required volume of water may be contained in, or introduced with, the distillate at any stage of its preparation, but in any event a very fine control may be obtained by titration of the distillate by a slurry of magnesium hydroxide in water irrespective of whether such slurry includes a powdered brucite, or the like, or whether the magnesium hydroxide is formed in the water as by adding magnesium oxide (MgO) thereto; the neutralization of the acid occurring by the use of an acid reactive, substantially water insoluble, reagent in the presence of water.

I claim as my invention:

1. A process of neutralizing acid oils which comprises: flowing a stream of acid oil through a restricted zone, continuously adding thereto a stream of water containing magnesium hydroxide in quantity sufficient to convert all the acid into water soluble salts, then separating the water and oil.

2. A process of neutralizing acid oils which comprises: flowing a stream of acid oil through a restricted zone, continuously adding thereto a stream of water containing magnesium hydroxide in quantity sufficient to convert all the acid into water soluble salts, then separating the water and oil; said water being in sufficient volume to dissolve all the water soluble salts.

3. A process of neutralizing acid oils which comprises: flowing a stream of acid oil through a restricted zone, continuously adding thereto a stream of water containing magnesium hydroxide in quantity sufficient to convert all the acid into water soluble salts, then separating the water and oil; the ratio of water to oil by volume varying from 1:8 to 1:2.

4. A process of neutralization which comprises: continuously flowing a stream of oil containing sulphuric acid through a restricted zone, continuously adding thereto a stream of water containing magnesium hydroxide in quantity sufficient to convert all the acid into water soluble salts, then separating the water and oil; said water being in sufficient volume to dissolve all the water soluble salts.

5. A process of neutralizing acid oils which comprises: flowing a continuous stream of acid oil through a restricted zone containing acid soluble material in lump form containing MgO and simultaneously concurrently flowing therethrough a continuous stream of water containing similar finely divided acid reactive material.

6. A process of neutralizing acid oils which comprises: flowing a continuous stream of acid oil through a restricted zone containing a sparingly water soluble acid reactive material containing MgO, simultaneously concurrently flowing therewith a continuous stream of water containing finely divided acid reactive material containing MgO whereby water soluble salts of said acid are formed, then separating the water containing said salts and the oil.

7. A process of neutralizing acid oils which comprises: flowing a stream of acid oil through a conduit containing magnesium hydroxide in lump form, concurrently flowing therewith a stream of water containing magnesium hydroxide whereby water soluble salts are formed, then separating the water containing said salts and the oil.

8. A process of neutralizing acid oils which comprises: continuously flowing acid oil through a conduit containing acid reactive material in lump form containing MgO, continuously adding thereto a suspension of finely divided acid reactive material containing MgO in water whereby water soluble salts of said acid are formed, then separating the water and oil; the water being in sufficient quantity to remove the water soluble salts from the oil.

9. That step in the process of neutralizing oils containing acids which comprises: simultaneously and concurrently flowing a mixed stream of water containing a finely ground magnesium hydroxide and acid oil through a stationary body of magnesium hydroxide.

10. That step in the process of neutralizing oils containing acids which comprises: simultaneously and concurrently flowing a mixed stream of water containing a finely ground magnesium hydroxide and oil which has been treated with sulphuric acid through a stationary body of magnesium hydroxide.

RAYMOND THAYER HOWES.